United States Patent
Peled et al.

(10) Patent No.: US 10,614,113 B2
(45) Date of Patent: Apr. 7, 2020

(54) STRUCTURAL DOCUMENT CLASSIFICATION

(71) Applicant: DocAuthority Ltd., RaAnana (IL)

(72) Inventors: Ariel Peled, RaAnana (IL); Itay Reved, Kiryat-Ono (IL)

(73) Assignee: DocAuthority Ltd., RaAnana (IL)

( * ) Notice: Subject to any disclaimer, the term of this patent is extended or adjusted under 35 U.S.C. 154(b) by 123 days.

(21) Appl. No.: 15/565,173

(22) PCT Filed: Apr. 14, 2016

(86) PCT No.: PCT/IL2016/050396
§ 371 (c)(1),
(2) Date: Oct. 9, 2017

(87) PCT Pub. No.: WO2016/166760
PCT Pub. Date: Oct. 20, 2016

(65) Prior Publication Data
US 2018/0096060 A1 Apr. 5, 2018

Related U.S. Application Data

(60) Provisional application No. 62/148,224, filed on Apr. 16, 2015.

(51) Int. Cl.
*G06F 16/35* (2019.01)
*G06F 16/93* (2019.01)

(52) U.S. Cl.
CPC ............ *G06F 16/353* (2019.01); *G06F 16/35* (2019.01); *G06F 16/93* (2019.01)

(58) Field of Classification Search
CPC ......... G06F 16/353; G06F 16/35; G06F 16/93
See application file for complete search history.

(56) References Cited

U.S. PATENT DOCUMENTS 9,477,756 B1 * 10/2016 Park ...................... G06F 16/951
2005/0021980 A1 * 1/2005 Kanai ................... G06F 21/608
713/182

(Continued)

FOREIGN PATENT DOCUMENTS

WO WO 2016/166760 10/2016

OTHER PUBLICATIONS

Supplementary European Search Report and the European Search Opinion dated Oct. 4, 2018 From the European Patent Office Re. Application No. 16779714.1. (10 Pages).

(Continued)

*Primary Examiner* — Alicia M Willoughby (57) ABSTRACT

A method of classifying documents. The method comprises providing a document mapping classifying dataset comprising document feature datasets, each one of the document feature datasets documenting document features of one of a plurality of documents, each one of the documents is associated with a structurality level and classified as related to one of a plurality of database specific categories, extracting a current document feature dataset from a document, performing an analysis of each of at least some of the document feature datasets to identify a similarity to the current document feature dataset while adjusting a dynamic similarity threshold according to a respective the structurality level of an associated document from the documents, selecting one of the documents according to the similarity, and classifying the current document as a member of a respective the database specific category of the selected document.

17 Claims, 4 Drawing Sheets

(56) References Cited

U.S. PATENT DOCUMENTS

| | | | |
|---|---|---|---|
| 2009/0154778 A1 | 6/2009 | Lei et al. | |
| 2009/0300046 A1* | 12/2009 | Abouyounes | G06F 16/58 |
| 2010/0262577 A1* | 10/2010 | Pulfer | G06F 21/6209 |
| | | | 707/608 |
| 2012/0041955 A1* | 2/2012 | Regev | G06F 16/355 |
| | | | 707/740 |
| 2012/0102046 A1* | 4/2012 | Tamano | G06F 16/3347 |
| | | | 707/748 |
| 2012/0109960 A1* | 5/2012 | Mishina | G06F 16/35 |
| | | | 707/737 |
| 2014/0270536 A1 | 9/2014 | Amtrup et al. | |

OTHER PUBLICATIONS

International Premilinary Report on Patentability dated Oct. 26, 2017 From the International Bureau of WIPO Re. Application No. PCT/IL2016/050396. (6 Pages).

International Search Report and the Written Opinion dated Aug. 8, 2016 From the International Searching Authority Re. Application No. PCT/IL2016/050396.

Communication Pursuant to Article 94(3) EPC dated Sep. 4, 2019 From the European Patent Office Re. Application No. 16779714.1. (8 Pages).

\* cited by examiner

STRUCTURAL DOCUMENT CLASSIFICATION

RELATED APPLICATIONS

This application is a National Phase of PCT Patent Application No. PCT/IL2016/050396 having International filing date of Apr. 14, 2016, which claims the benefit of priority under 35 USC § 119(e) of U.S. Provisional Patent Application No. 62/148,224 filed on Apr. 16, 2015. The contents of the above applications are all incorporated by reference as if fully set forth herein in their entirety.

BACKGROUND

The present invention, in some embodiments thereof, relates to structural document classification and, more specifically, but not exclusively, to structural document classification base on document feature analysis.

Document classification or document categorization is a problem in library science, information science and computer science. The task is to assign a document to one or more classes or categories. Known methods are used for manually or algorithmically classify documents. The intellectual classification of documents has mostly been the province of library science, while the algorithmic classification of documents is used mainly in information science and computer science.

Content based classification is classification in which the weight given to particular subjects in a document determines the class to which the document is assigned. It is, for example, a rule in a library classification that at least 20% of the content of a book should be about the class to which the book is assigned. In automatic classification it could be the number of times given words appears in a document.

Data management systems which use content based classification have traditionally existed as either enterprise software or managed service solutions. Enterprise software is typically deployed and maintained on an enterprise server.

Managed service solutions, such as the management of archival databases that contain customer information, are typically operated and maintained by a managed service provider within that provider's managed service environment.

SUMMARY

According to some embodiments of the present invention there is provided a method of classifying documents. The method comprises providing a document mapping classifying dataset comprising a plurality of document feature datasets, each one of the plurality of document feature datasets documenting a plurality document features of one of a plurality of documents, each one of the plurality of documents is associated with a structurality level and classified as related to one of a plurality of database specific categories, extracting a current document feature dataset from a document, performing an analysis of each of at least some of the plurality of document feature datasets to identify a similarity to the current document feature dataset while adjusting a dynamic similarity threshold according to a respective the structurality level of an associated document from the plurality of documents, selecting one of the plurality of documents according to the similarity, and classifying the current document as a member of a respective the database specific category of the selected document.

Optionally, the plurality of document feature datasets are plurality of document feature vectors.

Optionally, the method comprises selecting a document management/security policy to be applied on the current document according to the respective database specific category.

Optionally, the method comprises: monitoring changes to the current document updating the a current document feature dataset according to the changes, repeating the analysis to identify a new similarity to the updated current document feature dataset, selecting another of the plurality of documents according to the similarity, and reclassifying the updated current document.

Optionally, the method comprises monitoring access and changes to at least one of the current document or document permissions of the current document, a creation of a copy of the current document, a document of category and reporting access of the current document, changes to content of the current document and changes to permissions of the current document.

According to some embodiments of the present invention there is provided a method of creating a document mapping classifying dataset. The method comprises identifying a plurality of document features in each of a plurality of documents of at least one database, generating a plurality of document feature datasets, each one of the plurality of document feature datasets documenting respective the plurality document features of one of the plurality of documents, associating each one of the plurality of document feature datasets with a structurality level selected according to a presence or an absence of a plurality of structurality level indications, performing an analysis the plurality of document feature datasets to identify, in a plurality of iterations, a similarity between a plurality of pairs of the plurality of documents while adjusting a dynamic similarity threshold in each one of the plurality of iterations according to respective the structurality level, and generating a document mapping classifying dataset by classifying each one of the plurality of documents as one of a plurality of database specific categories according to the analysis.

Optionally, the method further comprises calculating the plurality of database specific categories by an analysis of the plurality of document feature datasets.

Optionally, the method further comprises generating a plurality of document feature datasets comprises a plurality of values extracted by text analysis of the plurality of documents.

According to some embodiments of the present invention there is provided an apparatus of classifying documents. The apparatus comprises a repository for storing a document mapping classifying dataset comprising a plurality of document feature datasets, each one of the plurality of document feature datasets documenting a plurality document features of one of a plurality of documents, each one of the plurality of documents is associated with a structurality level and classified as related to one of a plurality of database specific categories, an interface for designating a new document and a processing unit adapted to: extract a current document feature dataset from the new document, perform an analysis of each of at least some of the plurality of document feature datasets to identify a similarity to the current document feature dataset while adjusting a dynamic similarity threshold according to a respective the structurality level of an associated document from the plurality of documents, select one of the plurality of documents according to the similarity, and classify the current document as a member of a respective the database specific category of the selected document.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to structural document classification and, more specifically, but not exclusively, to structural document classification base on document feature analysis.

According to some embodiments of the present invention, there are provided methods and systems of generating a document mapping classifying dataset comprising a plurality of document feature datasets (e.g. vectors) for categorizing new and changed documents in one of a plurality of database specific categories. In use, a similarity between a document feature dataset of the new document and one of the document feature datasets is used for categorization. The document mapping classifying dataset sets a structurality level that allows reducing or increasing the similarity requirements during category similarity estimation. As described below, various structurality indications may be calculated to estimate the structurality level, for example by identifying a document type out of an index of document types.

For example, in some embodiments, the document mapping classifying dataset is generated by identifying a plurality of document features in each of a plurality of documents of one or more databases. Document features being layout (page margins, position of text and other objects, header and footer boundaries, page type, portrait/landscape), text styling (text alignment, text direction, text size, text template (e.g. heading, title, body), font, line and clause and character spacing, numbering, field data type, formula. As described below, various functions may be used to identify and extract document features from various types of documents. Then, a plurality of document feature datasets are generated such that each one of the document feature datasets documenting document features of one of the documents. Each one of the document feature datasets is associated with a structurality level selected according to a presence or an absence of a plurality of structurality level indications. Now, an analysis of the document feature datasets is performed to identify, in a plurality of iterations, a similarity between a plurality of pairs of the documents while adjusting a dynamic similarity threshold in each one of the iterations according to suitable structurality level. This allows generating a document mapping classifying dataset that classifies each one of the documents as one of a plurality of database specific categories according to the analysis. Each structurality level has a different criteria for comparison and each document can be compared to all other documents in the same level (such comparison may be performed in one action) for inclusion in the same category. The document mapping classifying dataset can now be used for categorizing new documents, for example by identifying a similarity of a document feature dataset mapping features of the new document to one of the document feature datasets in document mapping classifying dataset and categorizing the new document accordingly.

The above methods and systems provide an accurate automated classification of document that allow enforcing a consistent and adapted policies on groups of documents in different categories, enabling adaptable but consistent security, management, and governance of documents with persistency.

As described below, disclosed embodiments of the present invention provide a multifaceted classification approach, covering the many different dimensions of document analysis.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
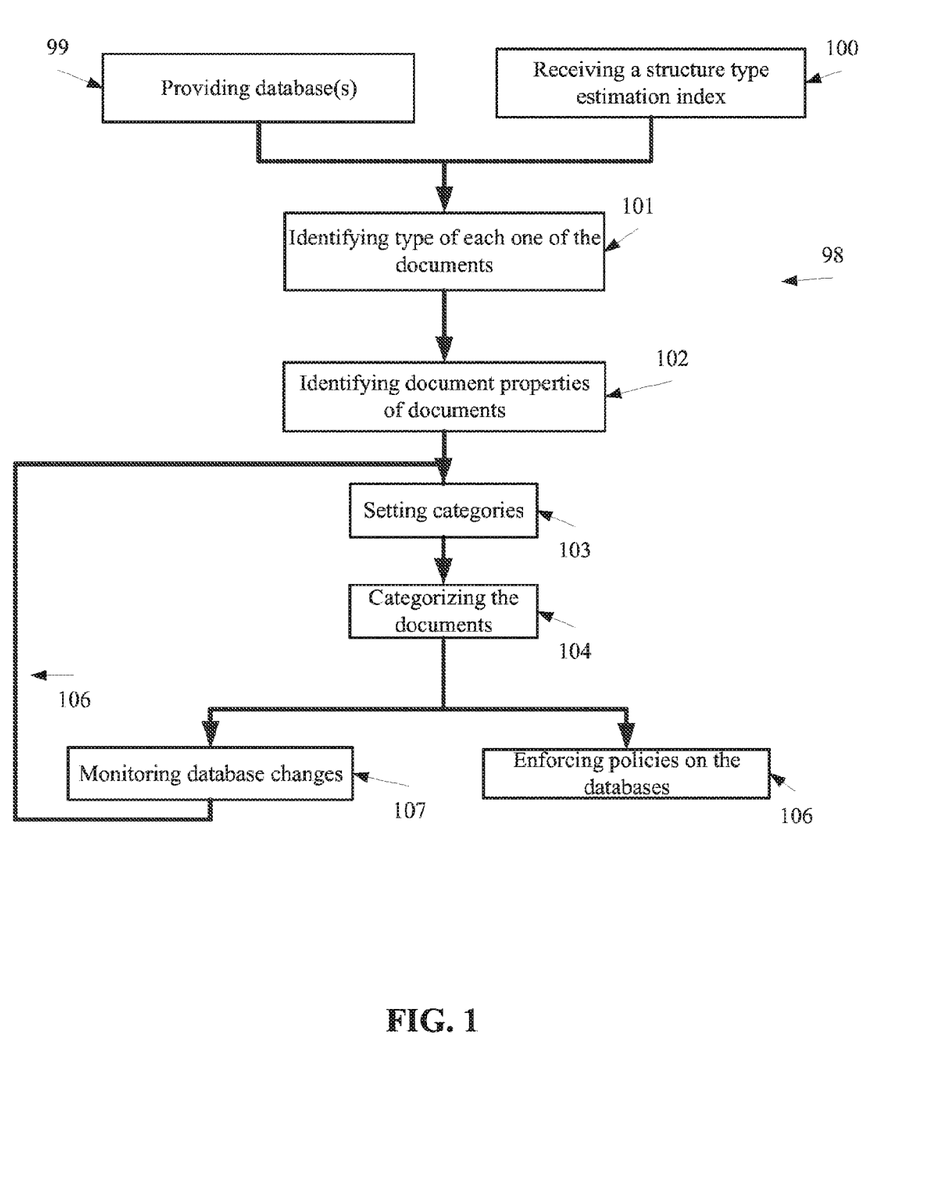
FIG. 1 is a flowchart of a method for automatically categorizing documents in a document database for setting policies for/controlling the access, storage, distribution, audit, retention and/or encryption, according to some embodiments of the present invention.

Reference is now made to FIG. 1 which is a flowchart of a method 100 for automatically categorizing documents in a document database for managing the access, storage, distribution, audit, retention and/or encryption of documents in different categories based on different policies, according to some embodiments of the present invention.

The method provides a solution to the problem of managing and protecting myriad documents in different tiers, for example 1,000, 10,000, 100,000, 1,000,000, 10,000,000 or any intermediate or larger number of documents by automatically or semi automatically categorize the documents into document groups which are managed separately by different policies.

As further described below the suggested embodiments do not rely only on textual rules engines which map word relations, placement and quantity and/or manually built vocabularies for building document categorization rules.

Furthermore, the categorization remains objective as documents are not categorized in user-assigned categories where different users label documents differently and inconsistently.

Furthermore, the method 98 is not based on a central document control mechanism which uses a category-based inventory list of documents but rather on a multifaceted classification approach, covering the many different dimensions of document analysis.

Figure 2:
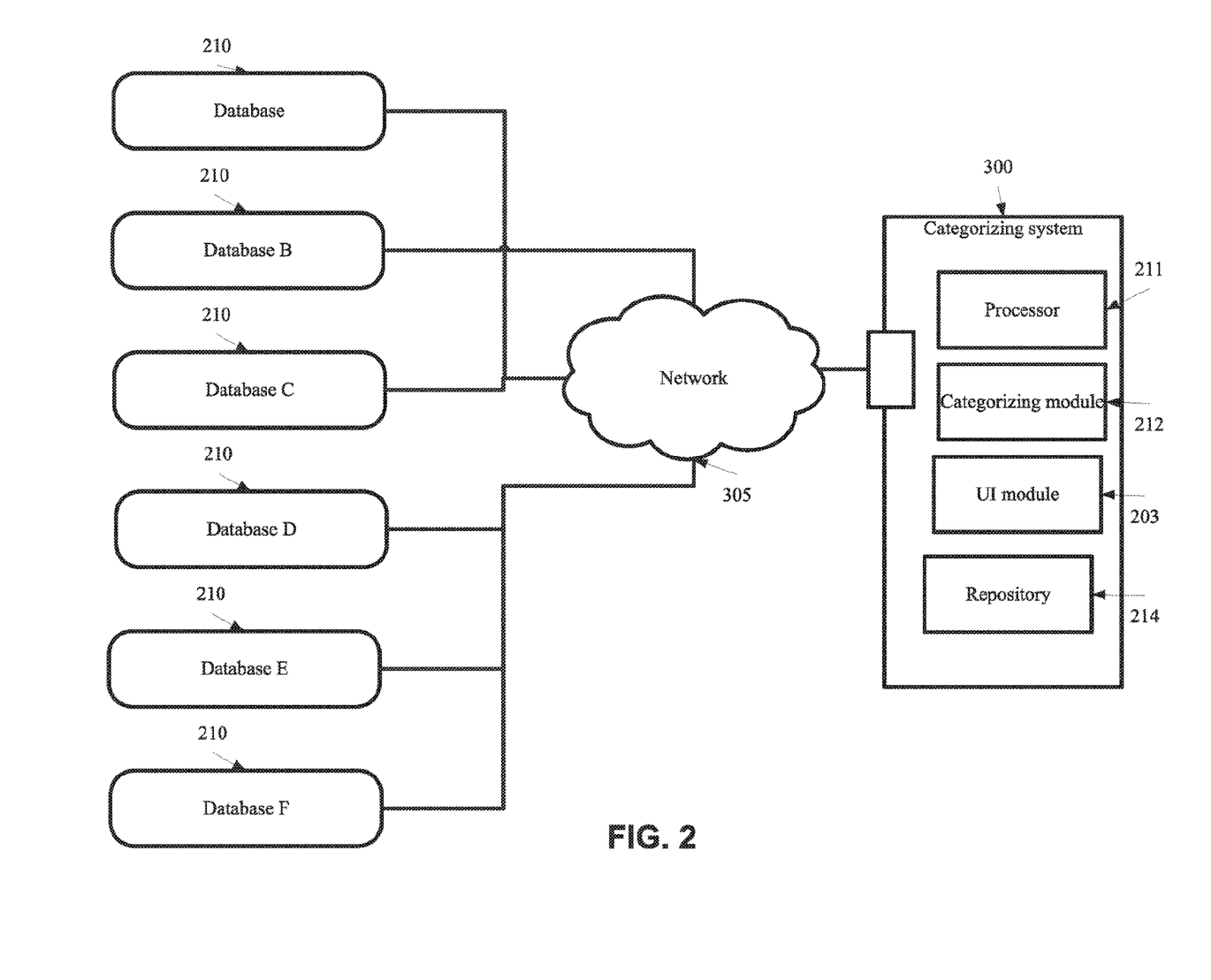
FIG. 2 is a schematic illustration of a categorizing system for categorizing documents in one or more for document databases, for example by running the method depicted in FIG. 1, according to some embodiments of the present invention.

Reference is also made to FIG. 2, which is a schematic illustration of a categorizing system 200 for categorizing documents in one or more for document database(s) 210 for managing the access, storage, distribution, audit, retention and/or encryption of documents in different categories based on different policies, for example by running the method 98 depicted in FIG. 1, according to some embodiments of the present invention. The system 300 includes a processing unit 211, such as one or more processors and a categorizing module 212 which includes logic to implement, for example the depicted in FIGS. 1 and 4. The documents may be of one of more companies of the enterprise, one or more offices or departments of a firm, and/or the like. The categorizing system 200 optionally includes a repository 214 that stores a document mapping classifying dataset formed during the categorization process.

As shown at 99, the one or more database(s) 210 are provided, for example designated selected or marked by the categorizing module 212. The databases may be local databases or databases accessible via a computer network.

As shown at 100, a document type estimation index is provided. The document type estimation index associate different document types, each having a different structurality degree, with a variance value. Optionally, the higher is the structurality level of documents in the document type, the lower is the variance value given to the documents. Such a correlation is based on the assumption that the accuracy of categorizing and estimating a business context of a document increases with its structurality level.

As shown at 101, the document type (and hence the structurality level) of each one of the documents in the database(s) 210 is identified based a type estimation function.

Optionally, the type estimation function scores each document according to a document features indicative of consistently and repetitiveness with other documents.

Optionally, the type estimation function is based on a calculation of an inversed level of a variance of layout, style, and/or static text fields in the document, optionally in relation to other documents in the document database(s) 210. The lower the variance, the higher is the structurality level of the document.

For example, a document type may be any of the following:

1. A manually filled form—a well-defined form filled by a human (for example using a pen) and then scanned (to TIFF, JPEG or PDF for example). For example, a loan request filled in hand writing.
2. A digitized form—A form in digital format (e.g. Portable Document Format (PDF)) with selectable and/or writeable fields among mostly predefined and unchangeable text or image segments.
3. An active form—A form in a digital format (e.g. Excel with protected fields) with selectable/writeable fields among mostly predefined and unchangeable fields, and with some values that are determined as a function of the entry fields. E.g. a pricelist form.
4. A formal form—A form in a digital format formally used within an organization as part of a well-defined business process, for example a business travel form.
5. A de facto form—a form without a formal declaration. These documents are more likely to have lower form structurality level, specifically in its styling. For example, IT internal SharePoint directory creation request.
6. A formal template—a template for a specific document category. Those may include legal/marketing boilerplates. For example a 10-Q form.
7. A de facto template—a template without a formal declaration. For example, a proposal or sales budgets excel sheet, a reminder email, and/or the like.
8. A boilerplate—a segment including one or more text segments or graphic objects added to many different documents and designated to carry a marketing or legal message. For example, a disclaimer, marketing pitch.
9. System-Generated Report—a report generated by a system or application, designated to an end user or another system. For example, Salesforce pipeline report, or SAP inventory list.

Optionally, boilerplates parts and/or any other of the above repetitive parts are set to be removed to improve future analysis accuracy.

Optionally, the document feature structure type may be determined by identifying a presence or an absence of one or more predefined indications in the document. The structure type may be represented by asset of binary or numeric values where a presence or an absence of each indication is represented by a binary value (e.g. 0 or 1) or numeric value (e.g. 0 or 255).

Reference is now made to various indications which may be evaluated when running the type estimation:

Optionally, a structurality level indication of a document having a structure type of a printed and/or scanned form type, for example an image and/or a PDF document by form parsing tools which extract and analyze structure and/or data. The categorization is made, for example, when images and/or field names are identified. Optionally, the document is processed by an Optical Character Recognition (OCR) process to allow comparing the text to one or more known forms. When a high correlation of content, headings, title(s) and graphical objects with one or more of the known forms is identified, a match thereto is estimated.

Additionally or alternatively, a structurality level indication of a document having a structure type of a digitized form type is identified when the string AcroForm, a fill-in form indicator, is identified in the PDF file. The field names and values are extracted to identify fields via field name correlation. Optionally, such indication is identified when variance exists only within content of entry-fields of the analyzed document. Different form elements, such as titles, body text, and layout(s) are indicative of mismatch with a known form. Content indicative Document features may be extracted from text within entry-fields and/or from names of fields and/or from a context deduced from a combination of entry-fields and field names.

Additionally or alternatively, a structurality level indication of a document having a structure type of an active form type is identified when protected cells are identified via user defined function such as:

Function IsCellLocked(iCell As Range) As Boolean
IsCellLocked=iCell.Locked
End Function The larger percentage of locked cells and/or sheets is the higher the chance of the document to be an Active From.

Such a document acts very much like a digitized form. It is mandatory that the large majority of the locked cells have to appear in each file of the same category. Also, further context can be analyzed from the text within the entry-fields (non-locked text fields). Names of fields can be used to identify the entities and/or subjects in the entry-fields. Changes to titles, headings, and/or to a lock editing status of cells renders the documents as not an active form.

Additionally or alternatively, a structurality level indication of a document having a structure type of an active form type is identified when protected cells are identified by an analysis of Extensible Markup Language (XML) structure. The larger percentage of locked cells and/or sheets is, the higher the chance of the document to be an Active From. When analyzing documents of the same type, when the majority of files have locked cells above set threshold and small-to-none variance as described above then the category type is an Active form and the files with high variance and few locked cells are removed from the category.

Additionally or alternatively, a structurality level indication of a document having a structure type of a formal form type is identified when the form formality variance is estimated to be between very small to no differences in the titles, headings, field, row arrangement, column names, and/or formula cells. Optionally, a higher grade may be given to document with richer styling and relative high presence of cell grid markings.

A structurality level indication that a document is not a formal form is a document that having many Document features which are not matching to other documents in the analyzed group. A document with major changes to one property vector or many small changes to most property vectors will be considered as outside the category.

When the majority of files in an analyzed file group have small-to-none variance as described above then the group's category type is set as a formal form type while files with high variance are not marked as related to a formal form type.

Additionally or alternatively, a structurality level indication of a document having a structure type of a De facto form type is identified when low variance of styling in relation to a set of templates, such as Word and/or Excel templates, for instance default template, is identified within the document, for example retaining one and/or two font types and few to no colors. When a majority of files have small-to-none form formality variance, as described above, the category type is set as formal form type and the files with high variance may be set as not related to this category type. Cells grid is barely marked or not at all in most cases.

Additionally or alternatively, a structurality level indication of a document having a structure type of a Formal Template is identified when an editable document, for instance a word-processing document, is identified as having persisted elements which remain unchanged and optionally maintain order with other Formal Template type documents. The persisted elements may be blocks of text, tables, images and/or headings. Those persisted elements are optionally unique elements which do not prevail or found in documents of other types or otherwise treated as boilerplates and ignored.

Additionally or alternatively, a structurality level indication of a document having a structure type of a spreadsheet when most headings, styling, layout and other formulas are identified as persisted elements located in parallel sheet cell for documents within a category. Optionally, a document identified as a formal template category type but do not have persisted elements as described above is removed from this category type.

Additionally or alternatively, a structurality level indication of a document having a structure type of a De facto template when no or low persistency elements are found as described above with reference to Formal Template type identification.

Additionally or alternatively, a structurality level indication of a document having a structure type of a De facto template when limited style variance is identified.

Additionally or alternatively, a structurality level indication of a Correspondence document, namely a freestyle form where one write to another is identified by using a template defining a structure with fieldnames of an email or a mail, a letterhead and/or a signature. Field contents may vary. For example, a presence of To and/or CC fields is indicative of Correspondence. Another example is limited styling apart of the letterhead and signature and great variance with body text in relation to other documents.

Additionally or alternatively, a structurality level indication of a document including boilerplate is identified when a boilerplate appears across different categories and structurality levels. The boilerplate may be a phrase or a clause (e.g. marketing message, legal disclaimer), a popular styling or a common object that appears in different document types and may be ignored during the document categorization which is described below. A boilerplate is measured in appearances and once it is above the threshold it is ignored and not used for the categorization process.

Additionally or alternatively, a structurality level indication of a document being a system-generated report is identified when a specific layout, style and headings of a report are identified highly persistently among documents identified as system-generated reports (very low Formality Variance). Such reports may also contain strings, style or objects which are unique to the system generating the reports and can positively identify them as its products. A manual analysis shall be done for such objects in order to map them to specific (known) systems. Such operation is not document corpora dependent but is permanent for all organizations.

Additionally or alternatively, the type estimation function estimates the structurality level of the document by an analysis document features which are indicative of form formality, for example:

a document property variance between the layout and data attributes of headings (text) in the document and in other documents of the document database(s) 210;

a document property variance between the field names in the document and in other documents of the document database(s) 210; and a document property variance between the document style and/or formulas in the document and in other documents of the document database(s) 210.

Optionally, this document property variance, which may be referred to as a form formality variance, is evaluated by matching between the document and a plurality of documents from the database(s) 210 which share a specific document type (i.e. as described above) and/or category with the document.

Optionally, as an outcome of this stage, each of the plurality of document feature vectors is associated with a document type indicative of a structurality level and/or with structurality level grade or score.

As shown at 102, a plurality of document features are extracted from each of the documents in the document databases(s) 210, optionally using one or more feature extraction functions adapted for the type of the document.

The document features are optionally arranged in a vector, also referred to herein as a document feature vector. The sum of the vectors is stored in a dataset, for example an array of vectors. A feature may be a binary, numeric, and/or textual value, that is extracted from a document or calculated based on analysis of one or more portions of the document, for example as described below. It should be noted that although vectors are used in this description, features and properties of categories and documents may be arranged in various datasets, such as matrixes or tables.

In some embodiments, the dataset is a two levels key-value store unit wherein each document is assigned with a unique identifier, also referred to herein as a file identifier (ID). Each document feature vector is identified by a type value representing a document type associated with the document in 101. The document feature vector includes a set of key-weight pairs where the key is a unique value representing a document feature extracted by an analysis of the document, for example as described below, and the weight is a weight allocated for this feature.

In these embodiments each document may be represented by the following logical model:

| Document: | | | |
|---|---|---|---|
| File-id | $DV_1$ (of type $T_1$) Map<key,weight> | ... | $DV_n$ (of type $T_1$) Map<key,weight> | a document feature vector is added into a mapping classifying dataset such as a two physical data store models:

| DVKeyStore - Map by DV Keys: | |
|---|---|
| Key | Weight |
| DV-key + DV-Type Equivalent notation: Map< DV-key + DV-Type, Set<file-id> > | Set<file-id> |

| FileIdStore - Map by File-Ids: | |
|---|---|
| Key | Weight |
| File-Id + DV-Type Equivalent notation: Map< File-Id + DV-Type, Map<DV-key, weight> > | Map<DV-key, weight> | where key value is indicative of a feature.

The document features in a document feature vector are a unique signature of the respective document.

Reference is now made to exemplary feature extraction functions which may be applied to extract feature data, optionally based on the type of the document.

1. A Filename feature function—a function which identifies and extracts a Filename as a feature. In an exemplary implementation a filename is divided into 2-grams to create a high level index. In such a manner, similarity can be evaluated by a match threshold (e.g. 50%) to deeper comparison, for example by calculating an edit distance. Optionally, another feature is a data structure. Regular expression (regex) is used to identify a version and date data in filename. Periodical time values (e.g. months, quarters, years) sharing a similar structure increase category likelihood. Optionally, versioning patterns (e.g. "v1", "v2") are calculate as a feature that increases category similarity. In some case (e.g. when full month name is used) the date/versioning elements may be removed before the 2-gram index analysis.

2. A Word-processing function—a function that is applied on textual files and breaks a document into atomic objects. The atomic unit is optionally a string of words that has the same styling and does not include a discontinuity (e.g. period, colon, semi-colon, comma in some cases, carriage return, page break, language change, inserted object, image etc.). When the atomic unit ends with a colon, a Tab-character or is a heading—it becomes a candidate for a field name (see field analysis). Each atomic unit is optionally canonized by removal of punctuation marks, stop words, excess spaces, tabs and hyphens in numbers. Then, the atomic unit goes through initial ingestion that extracts a full block hash, 5-gram hash, style, including format such as date or currency, when known, an analysis such as patterns (e.g. using REGEX), entity extraction (string permutations that may include names, addresses, telephone numbers, identifiers such as SSN and drive license number, etc.), context extraction (e.g. time/date, location, sums, amounts) that will have higher likelihood score when near a field name. Each atomic unit is stored in a database containing respective ingestion properties, absolute and relative location in this hierarchy (under same parent node), and parent node (e.g. heading, table object, etc.), file name, file URI, storing system ID, and access rights. Optionally, a key-value big data database is used to effectively store atomic units and their properties as well as quickly find related atomic units. The index may be 5-gram hash, parent node and additional data.

3. A headings Identification function—a function that identifies and extracts a style per Headings. For example font, color, boldness, and underline. This allows estimating style differences.

4. A letterhead identification and analysis function—a function that identifies and extracts text blocks that comprise a letterhead. Usually there are several key fields such as date, "to:"/"Attention to:", "from:", and "Subject:" or "Re:". Identification of letterheads is key in identifying correspondence super-type. The specific terms and layout of the letterhead fields will identify the specific correspondence category.

5. A Formal Signature identification and analysis function—a function that identifies and extracts s signature block by identifying a pattern consisting of a full name, a position, a company name, an address, telephone number(s), website link and/or social media ID(s). The specific terms and layout of the signature block may identify the specific correspondence category. If positively identified, the signature data may be an entity object to be used for further classification.

6. A Minutes/Memo function—a function that identifies and extracts a pattern, such as a Minutes/Memo pattern, for instance a heading comprising the following fields: "Date: Attention to: Subject". First level index shall be based on heading histogram (on both heading hash, heading style), atomic unit and/or block style histogram, full block hash, 5-gram hash, term frequency-inverse document frequency (TF-IDF) group, objects' hash, and header and/or footer hash.

7. A spreadsheets function—a function that identifies and extracts cells considered as atomic units. First, cell values, formulas, and styling are extracted while absolute and relative locations are kept.

8. A presentations function—a function adapted for PowerPoint, Key, and keychain and set to extract text snippets as objects, including their locations.

9. A Page Layout Files function—a function adapted for identifying page layout for identifying similarly to word processing files.

10. An image function that outputs one or more encoded datasets, such as quantization tables with proliferating items. This allows computational efficient comparison between encoded datasets to find similarity. Image may be broken to zones where a zone with in image text may be processed using OCR to allow further processing by any of the above function(s) and imagery objects, such as logos, are represented in quantization tables.

11. An OrCAD or AutoCAD function adapted to process files, such as DWG, DXF files. This function separately processes image zones. Specific zones are identified based on the vectors geometrical positions (mass identification). Each vector is represented by a function of length and angle. A histogram of the values of each document is calculated and used as a basis for comparison to other documents. Additional text analysis may be performed on the document's textual portions.

12. A Code files function—a function for identifying and extracting Code files. This allows grouping files into categories based on the projects they belong to.

13. A Vector Image Files function which analyzes files like Ai, eps, ps, svg, cdr similarly to an analysis of OrCAD or AutoCAD function.

14. A Field title analysis function—a function that identifies titles in documents such as PDF, Word, Excel, and HTML/XML files.

15. A Field value extraction and BI function—functions outputs an indication by cross correlating entities with an entity extracted from a data management sheet or table to identify lost and/or dropped and/or unregistered entities.

16. A Business Context Analysis function—a function that identifies and extracts a level of formality. The higher is the formality level, the higher is the business context category certainty. Optionally, the function runs a form discovery process to analyze form structure among all instances and title fields and changeable fields.

17. A Field title identification function—functions that identify and extract field name candidates as atomic units which are headings or end with a colon or a Tab-character. Other identifying features may be a start in a new line, a start after a tab or spaces sequence, a tabulated structure in the upper or most left atomic unit or cell or in the upper part or most left part of an atomic unit or cell itself. It is possible to have several fields in the same atomic unit or cell, separated by new line.

18. An identification of field data function—a function that identifies and extracts data from fields in proximity to the Field title.

19. An extraction of business data from fields function—a function that identifies content with business entity(ies) or data identifiers to allow comparing different files in the same category and analyzed for its data type (e.g. date, price, address, customer name, transaction number, project name). The business entity(ies) or data may be imported from corporate applications such as ERP (vendor names, transaction IDs, pricelists), CRM (customers, channels), HR/Active Directory (employee data) and/or the like. Once identified, data including a business entity indication may be used for further classification of the files, in order to create the business context of the document.

20. A Relations Analysis function—a function that generate an output by measuring whether the document has storage and/or origin and/or reference relations with another category document, for example documents found in a common email or directory, have common access rights, accessed via a common URL, URI, or a reference such as file name, title or business function (e.g. "Pricelist").

21. A connectivity function—a function that identifies and extracts access rights. A document may be accessed either with a specific client installed, with remote access, through an existing endpoint security client or developing a light local client that connects to a locally installed anti-virus.

Now, as shown at 103, each one of the documents is categorized into one of a plurality of database specific categories where the type associated therewith defines a category variance, according to some embodiments of the present invention.

The categorization is optionally performed iteratively by matching, where in each one of the iterations a document feature vector of one document is matched with the document feature vectors of the other documents.

Optionally, as shown at 104, during this iterative process, all of the documents in the one or more of the database(s) 210, for example some or all of the above processed documents, are processed to identify a set of database specific categories which are relevant to an enterprise (or organ) to which the database(s) 210, belongs, for instance a bank, an insurance company, a retailer and/or the like. The outcome is groups of documents each categorized in a different category. As an outcome of this process, documents of an enterprise having a similar business function for the enterprise are categorized in a common group.

Optionally, category properties are calculated per category, for example by an analysis of the document features of the documents in the database(s) 210 or a portion thereof. Each category property in the vector is optionally a statistic measure calculated by respective document features in the category, for example an average or mean of document feature values and/or a set of strings or keywords prevailing, for instance above a threshold, the document feature vectors.

Once database specific categories are identified, for example, a category name, a category title proposal, a category owner, a category review priority, and/or a management policy. The management policy is optionally selected from a group consisting of a default security management policy, a default storage management policy, and/or a default compression policy.

Optionally, category properties may be manually tuned by an operator, for example using a user interface (UI) managed by a UI module 203. This allows the operator to fine-tune which category properties. The operator may rename categories, join categories into one, and/or delegate category review to other operator(s). The operator may re-assign document(s) to new categories and/or manually create new categories. Optionally, a categorizing vector is set per category.

In some embodiments, in order to categorize a single document, identified by file-ID value fid0, the document is matched with document feature vectors of some or all of the other documents in the database(2) 210, for example with documents of the same type. A similarity rate between two documents (e.g. represented in two different files) may be performed as follows:

$$S_{T1}(fid1, fid2) = \Sigma_{key\ in\ PV1 \cap PV2}\ min(PV1.\text{value}(key), PV2.\text{value}(key))$$

where similarity of two files of the same type are matched and when fid1 denotes File ID of a first file, fid2 denotes File ID of a second file, PV1 denotes a First file document feature vector and PV2 denotes a second file property vector.

The exemplary matching process may be performed to compare between the single document, for example fid0 and some or all of the other documents:

1. Iterating on the document types, comparing for documents in one of the types where the estimated computational complexity is about O(1).
2. Set of file-IDs that contains a single DV1 key:
   $FS_i = PVKeyStore.\text{value}(PV1.key_i)$ where the estimated computational complexity is about O(1).

3. Unite all sets into a single set: $FS=\cup_i FS_i$ where the estimated computational complexity is about O(DV1.size).
4. Remove fid1 from FS to avoid self-comparison. FS=FS.remove(fid0) where the estimated computational complexity is about O(1).
5. For all files in FS, get its corresponding DV: $PV_j$=FileIdStore.value(fid$_j$+T$_t$) where the estimated computational complexity is about (FS.size).
6. Calculate similarity rate: $SR_j = S_{T_t}$(fid0, fid$_j$) where the estimated computational complexity is about O(FS.size× DV1.size).
7. Category of file fid0 on dimension $T_t$: $C_{T_t}=\cup$fid$_j$ for which SR$_j$>ST where ST denotes a predefined similarity rate threshold set as a constant and the estimated computational complexity is about O(FS.size).

As the average number of items in FS is limited in existing databases scenarios, the above exemplary matching process is scalable. This is a result of a unique selection of the property extraction dimensions and key signature generation. The number of items in FS may be reduced by using DV matching from other dimensions before running steps 5 to 7.

The higher is the structurality level, the lower is the category variance.

Figure 3:
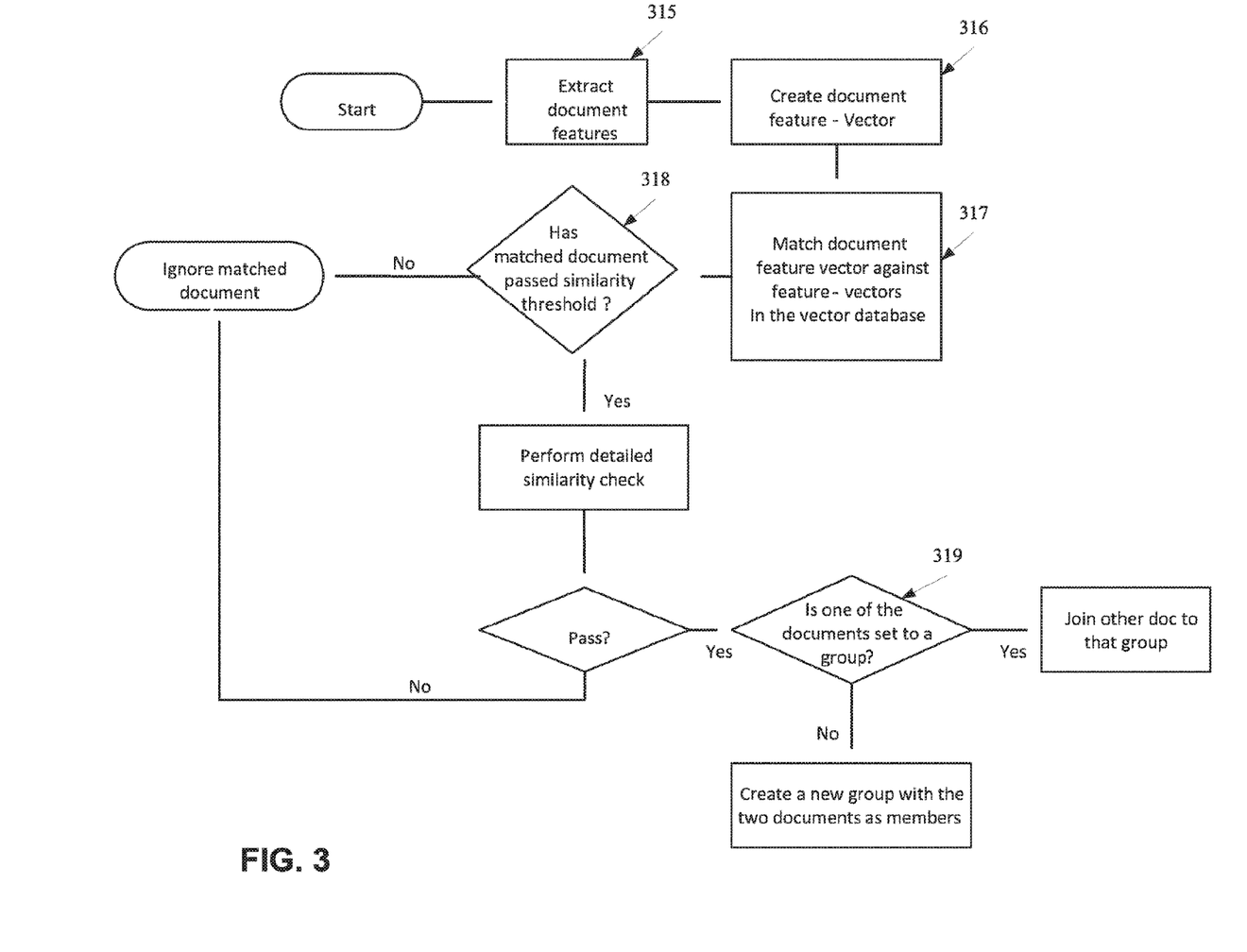
FIG. 3 is a flowchart depicting the categorization, according to some embodiments of the present invention.

101-103 may be referred to as a pre-processing stage wherein a document mapping classifying dataset that includes the above document feature vectors is calculated. For example, FIG. 3 is a flowchart depicting the categorization, according to some embodiments of the present invention. In the depicted process, a received document is analyzed to extract document features 315 and to create a document feature vector 316. The document feature vector is matched with other document feature vectors 317. When similarity to another document passes a threshold 318, for example to a subgroup of features, a full similarity is performed. As shown at 319, when a similarity is found to an uncategorized document, a new category is formed.

Optionally, as shown at 106, one or more management policies are enforced on the accessing and/or editing of the documents in the databases 210 and/or on new documents added or associated with the databases 210, for example by one or more management policy enforcement agents 202. The enforcement may be applied by a gateway managing the access to the databases 210 and/or by local agents which are located in the databases 210.

Optionally, as shown at 107, changes to the content of the database are monitored, for example the addition, the editing, and/or the removal of documents from the databases 210, for example by a monitoring module 201 that is installed to crawl the databases 210, as a proxy that inspects access requests to the database(s) 210 and/or as a module that receive change notification(s) from the database(s) 210.

As shown at 106, a new document which is added or an existing document which is changed is categorized similarly to the described above in 103 (naturally only one iteration is needed where document feature vector is created for a new document). Optionally new database specific categorizes are created when the database is changed, for example by repeating 102 or a portion thereof.

Figure 4:
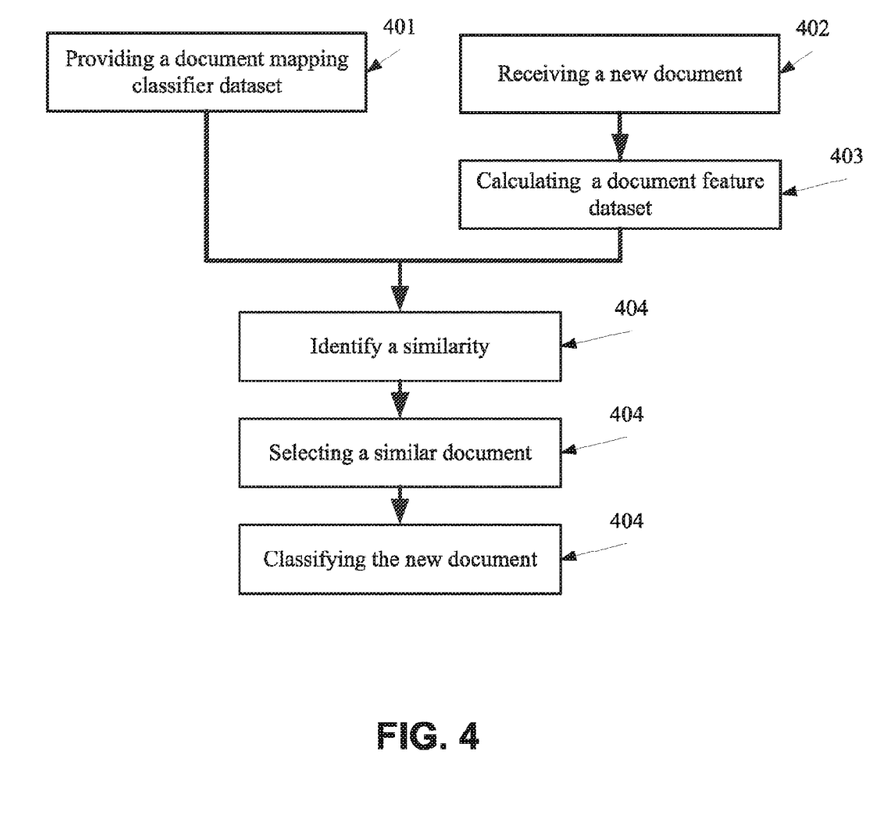
FIG. 4 is a process of classifying a new document using a document mapping classifying dataset, for example a document mapping classifying dataset, according to some embodiments of the present invention.

For example FIG. 4, depicts a process of classifying a new document using a document mapping classifying dataset, for example a document mapping classifying dataset generated as described above, according to some embodiments of the present invention. First, as shown at 401, a document mapping classifying dataset comprising a plurality of document feature datasets, for example the above document feature vectors is provided. In this database each one of the document feature datasets documents a plurality document features of one of the plurality of documents of the databases 210 and associated with a structurality level, for example a document type. Each document is classified as related to one of a plurality of database specific categories, for instance as described above. As shown at 402, a new document is received. As shown at 403, a current document feature dataset, for instance a vector, is extracted from the new document, for example as described with reference to 102. This allows, as shown at 404, performing an analysis of each of some or all of the document feature datasets to identify a similarity to the current document feature dataset while adjusting a dynamic similarity threshold according to respective the structurality level. The matching may be performed as described with reference to 103. Now, as shown at 405, one of the documents in the database is selected according to the analysis, for example as shown at 404. Based on this selection, as shown at 405, the current document is classified as a member of the database specific category of the selected document.

Optionally, existing documents may be continually or iteratively reallocated when new categories are defined.

As described above, documents in database(s) 210 are categorized a training set, based on similarity, during the pre-processing stage. During this stage, each of some or all of the existing documents in the database(s) 210 is analyzed and converted into a set of document feature vector.

Optionally, the document feature vectors are arranged in a dataset having a linear proportion (at max) to the total size of the documents in the database(s) 210, namely a function of both the number and volume of the documents. As a single document classification is performed with a bounded elapsed time which has low correlation to the storage size of the database(s) 210, the dataset assures a scalability of the categorization process.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a unit, a processor, a document, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of applying document policies, comprising:
   accessing, by a processor, a repository storing a document mapping classifying dataset that classifies each one of a plurality of documents as one of a plurality of database specific categories, the document mapping classifying dataset comprising a plurality of document feature datasets, each one of said plurality of document feature datasets documenting a plurality document features of one of the plurality of documents, each one of said plurality of documents is associated with a structurality level and classified as related to one of said plurality of database specific categories, wherein each of said plurality of database specific categories represents a group of documents having a shared set of document features, wherein said structurality level indicates a variability level of structural properties among documents belonging to a same specific category, said structural properties include at least one of layout, style and static text fields;
   receiving through an interface a current document;
   using said processor to automatically:
   extract from said current document a current document feature dataset;
   perform an analysis of each of at least some of said plurality of document feature datasets to identify a similarity to said current document feature dataset, said similarity is identified based on a dynamic similarity threshold adjusted according to said structurality level associated with each of said at least some of said plurality of document feature datasets;
   select one of said plurality of documents according to said similarity;
   classify said current document as a member of a respective said database specific category of said selected document; and
   using at least one management policy enforcement agent to automatically enforce a document policy of accessibility rights on said current document according to said respective database specific category, said at least one management policy enforcement agent controls at least one of an access to said current document, a distribution of said current document, and an encryption of said current document, according to said document policy.

2. The method of claim 1, wherein said plurality of document feature datasets are plurality of document feature vectors.

3. The method of claim 1, wherein said at least one management policy enforcement agent is a gateway managing an access to a database storing said current document and/or a local agent located in a database storing said current document.

4. The method of claim 1, further comprising:
   monitoring changes to said current document;
   updating said a current document feature dataset according to said changes;
   repeating said analysis to identify a new similarity to said updated current document feature dataset;
   selecting another of said plurality of documents according to said similarity; and
   reclassifying said updated current document.

5. The method of claim 1, further comprising:
   monitoring:
   access to said current document, changes made to at least one of: said current document and document permissions of said current document, and
a creation of a copy of said current document; and
reporting access to said current document, changes to content of said current document and changes to permissions of said current document, according to said monitoring.

6. A method of creating a document mapping classifying dataset for applying document policies, comprising:
accessing, by a processor, at least one database through a computer network, said at least one database storing a plurality of documents;
using said processor to automatically:
identify a plurality of document features in each of said plurality of documents of said at least one database,
generate and store in a repository, a plurality of document feature datasets, each one of said plurality of document feature datasets documenting respective said plurality document features of one of said plurality of documents,
associate each one of said plurality of document feature datasets with a structurality level selected according to a presence or an absence of a plurality of structurality level indications,
perform a plurality of analyses, each in another one of a plurality of iterations, wherein in each of said plurality of analyses a different pair of document features datasets are analyzed, to identify a similarity between a respective pair of documents of said plurality of documents and wherein in each one of said plurality of iterations a dynamic similarity threshold is adjusted according a respective said structurality level associated with said different pair of document features datasets, and
generate and store in said repository a document mapping classifying dataset by classifying each one of said plurality of documents as one of a plurality of database specific categories according to said analysis wherein each of said plurality of database specific categories represents a group of documents having a shared set of document features; and
using at least one management policy enforcement agent to automatically enforce a document policy of accessibility rights on each of said plurality of documents according to a respective said database specific category, said at least one management policy enforcement agent controls at least one of an access to a respective said document, a distribution of a respective said document, and an encryption of a respective said document, according to said document policy;
wherein said structurality level indicates a variability level of structural properties among documents belonging to a same specific category, said structural properties include at least one of layout, style and static text fields.

7. The method of claim 6, further comprising calculating said plurality of database specific categories by an analysis of said plurality of document feature datasets, wherein each of the calculated plurality of database specific categories represents a group of documents having a shared set of document features and a common structurality level.

8. The method of claim 6, wherein said generating a plurality of document feature datasets comprises a plurality of values extracted by text analysis of said plurality of documents.

9. An apparatus of applying document policies, comprising:
a repository for storing a document mapping classifying dataset that classifies each one of a plurality of documents as one of a plurality of database specific categories, the document mapping classifying dataset comprising a plurality of document feature datasets, each one of said plurality of document feature datasets documenting a plurality document features of one of the plurality of documents, each one of said plurality of documents is associated with a structurality level and classified as related to one of said plurality of database specific categories, wherein each of said plurality of database specific categories represents a group of documents having a shared set of document features and wherein said structurality level indicates a variability level of structural properties among documents belonging to a same specific category, said structural properties include at least one of layout, style and static text fields;
an interface for designating a new document; and
a processing unit adapted to automatically:
extract a current document feature dataset from said new document;
perform an analysis of each of at least some of said plurality of document feature datasets to identify a similarity to said current document feature dataset based on a dynamic similarity threshold set according to a respective said structurality level of an associated document from said plurality of documents;
select one of said plurality of documents according to said similarity;
classify said current document as a member of a respective said database specific category of said selected document; and
enforce, by instructing at least one management policy enforcement agent, a document policy of accessibility rights on said current document according to said respective database specific category, said at least one management policy enforcement agent controls at least one of an access to said current document, a distribution of said current document, and an encryption of said current document.

10. The method of claim 1, wherein said document policy is applied for controlling an access to said current document.

11. The method of claim 1, wherein said document policy is applied for controlling a distribution of said to said current document.

12. The method of claim 1, wherein said document policy is applied for controlling an encryption of said current document.

13. The method of claim 1, wherein said similarity is a calculated by repeating the following for at least some of said plurality of documents:

$$S_{T1}(fid1, fid2) = \Sigma_{key\ in\ PV1 \cap PV2} \min(PV1.\text{value}(key), PV2.\text{value}(key))$$

where fid1 denotes File ID of said current document, fid2 denotes File ID of one of said plurality of documents, PV1 denotes said current document feature dataset and PV2 denotes one of said plurality of document feature datasets.

14. The method of claim 1, said plurality of database specific categories comprise at least some of a group consisting of a manually filled form, a digitized form active form, a formal form, a formal template, and a boilerplate System-Generated Report.

15. The method of claim 1, wherein said document policy is applied by at least one of: a gateway managing an access to a database storing said current document and a local agent located in said database.

16. The method of claim 6, wherein said generating a plurality of document feature datasets comprises removing boilerplate parts from said plurality of documents.

17. The apparatus of claim 9, wherein said document policy is applied by at least one of: a gateway managing an access to a database storing said current document and a local agent located in said database.

* * * * *